United States Patent [19]

Redshaw

[11] Patent Number: 4,539,557
[45] Date of Patent: Sep. 3, 1985

[54] COMBINED COMMUNICATION, SECURITY AND ALARM RADIO SYSTEM

[75] Inventor: Norman L. Redshaw, Whitley Bay, England

[73] Assignee: Sunderland & South Shields Water Company, Sunderland, England

[21] Appl. No.: 434,705

[22] Filed: Oct. 15, 1982

[30] Foreign Application Priority Data

Oct. 19, 1981 [GB] United Kingdom ............ 8131499

[51] Int. Cl.³ .............................................. G08B 1/08
[52] U.S. Cl. .................................. 340/539; 340/531;
455/7; 455/11; 455/54; 179/5 R
[58] Field of Search ............... 340/539, 500, 521, 506,
340/531, 534, 533, 825.29, 825.44, 825.54,
825.69, 825.72, 307, 346, 345, 696; 455/4, 7, 9,
11, 13, 14, 16, 53, 54, 55, 56, 58, 73, 89, 92, 95,
99, 100, 103; 179/5 R, 5 P

[56] References Cited

U.S. PATENT DOCUMENTS

| | | | |
|---|---|---|---|
| 3,864,674 | 2/1975 | Worsham et al. | 340/539 |
| 3,914,692 | 10/1975 | Seaborn, Jr. | 340/539 |
| 3,925,763 | 12/1975 | Wadhwani et al. | 340/539 |
| 3,973,200 | 8/1976 | Akerberg | 340/825.44 |
| 4,197,497 | 4/1980 | Phelps | 340/825.69 |

*Primary Examiner*—Donnie L. Crosland
*Attorney, Agent, or Firm*—Toren, McGeady, Stanger, Goldberg & Kiel

[57] ABSTRACT

A combined communication, security and alarm radio system for supervising equipment in a plant or installation, in which a base transmitter/receiver (4) is in two way communication with a remote control unit (2). A plurality of portable transmitter/receiver units (12) enables direct communication between operators through the base transmitter/receiver unit (4). An alarm message unit (8) connected to both the control unit (2) and a telephone exchange landline enables pre-recorded messages to be transmitted in sequence to a plurality of subscribers. Each portable transmitter/receiver unit (12) has a push button (27) to activate the alarm message unit (8) through the base transmitter (4) each being recognizable by its own tone. The system also includes a paging transmitter (6) and up to as many paging receivers (14) as there are portable units (12). A plant alarm unit (10) is automatically activated when failure or malfunctioning of equipment occurs or when there is unauthorized entry, this causing the paging transmitter (6) to operate instantaneously and the alarm message unit (8) to operate after a predetermined delay.

10 Claims, 1 Drawing Figure

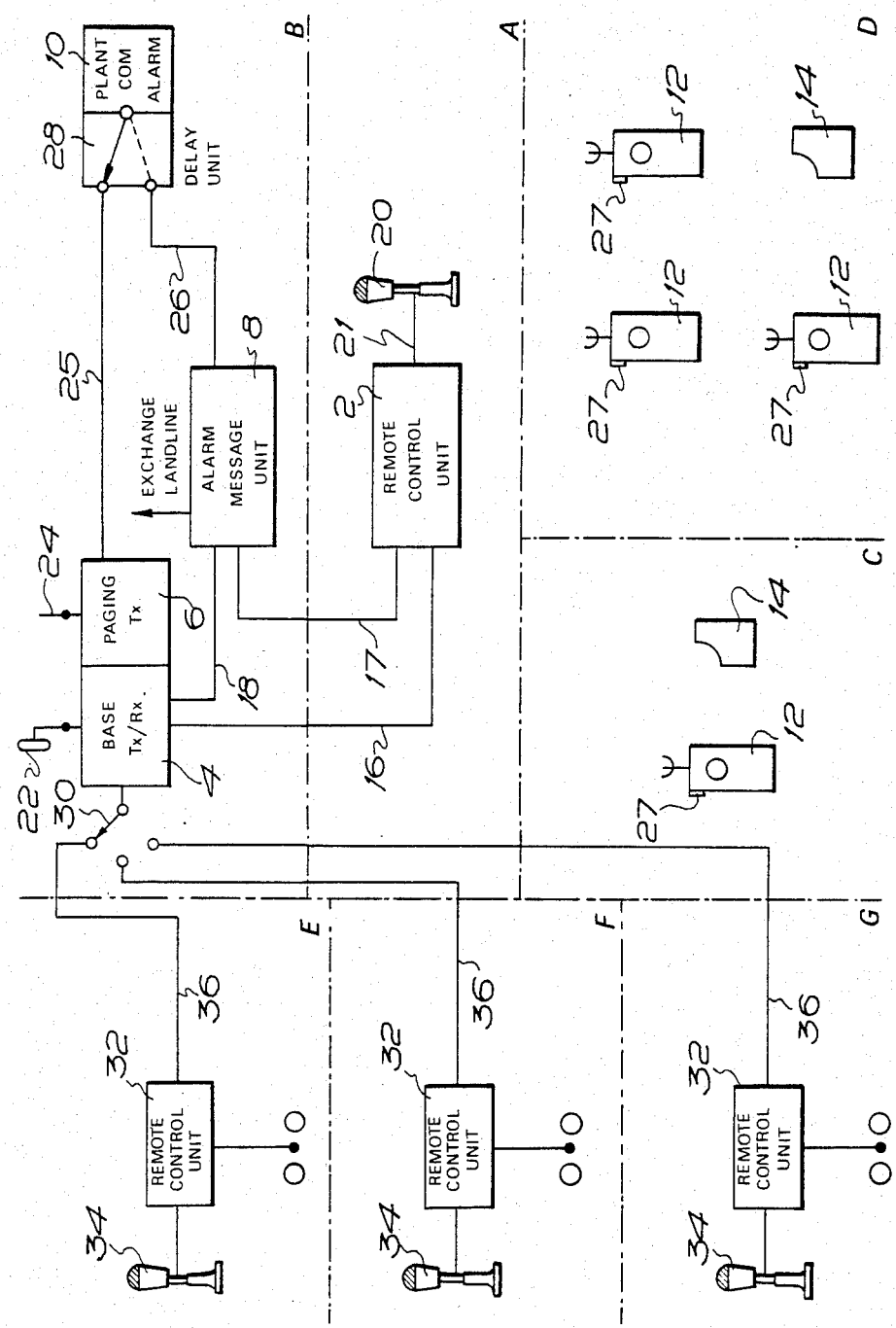

COMBINED COMMUNICATION, SECURITY AND ALARM RADIO SYSTEM

FIELD OF THE INVENTION

The present invention relates to a combined communication, security and alarm radio system.

DESCRIPTION OF THE PRIOR ART

Systems which are designed to protect plants and installations against unauthorized entry are well known. Likewise, systems designed to protect plants against malfunction by sounding or indicating an alarm condition are well known.

Furthermore radio transmitter/receiver systems and paging systems for paging personnel within a plant or installation are well known.

In certain types of plants or installations a lone operator may be in charge during the night or at other times when the normal day-time personnel are not around such as during the week-end or on bank holidays. It is important that if he should need assistance for whatever reason, he can make instant contact so that assistance can be rendered in the shortest possible time.

For example, assistance may be required if the plant or installation is broken into, or if some malfunction of the equipment occurs which could be dangerous if the fault is not rectified or the particular piece of equipment isolated.

SUMMARY OF THE INVENTION

Accordingly, the present invention more specifically relates to a composite radio based communication system combining two way speech between operators and a security facility whereby a lone operator can summon assistance. In a preferred form, the system also incorporates an alarm function, which warns the operator that some equipment has broken down or is malfunctioning so that he can be summoned back to a central point and either rectify the fault himself or call for assistance.

According to the present invention there is provided a combined communication, security and alarm radio system for supervising equipment in a plant or installation, said system including:

(a) a remote control unit;

(b) a base transmitter/receiver in two way communication with the remote control unit;

(c) a plurality of portable transmitter/receiver units tuned to the frequency of the base transmitter/receiver to enable direct communication between operators through the base transmitter/receiver;

(d) an alarm message unit connected to the remote control unit and also to a telephone exchange landline, for sending out pre-recorded alarm messages in sequence to a plurality of subscribers; and (e) manually operable means on each portable transmitter/receiver unit for triggering the base transmitter/receiver to activate the alarm message unit, said alarm message unit simultaneously transmitting to the subscribers in sequence the pre-recorded alarm message over the telephone exchange landline and to the portable transmitter/receiver units through the base transmitter/receiver.

A single frequency paging transmitter may be located at the base transmitter/receiver and up to as many paging receivers provided as there are portable transmitter/receiver units.

Preferably each portable transmitter/receiver unit has its own tone so as to enable each unit and hence its operator to be recognizable by both the base transmitter/receiver and the alarm message unit when the associated manually operable means is activated.

The system may also incorporate a plant alarm unit which is automatically activated when either a part of the equipment has broken down or is malfunctioning or for example when unauthorized entry has been made into the plant or installation.

The plant alarm unit on being activated is preferably designed to cause the paging transmitter to operate instantaneously and after a predetermined delay to cause the alarm message unit to operate to transmit the pre-recorded alarm message to the subscribers in sequence and to the portable transmitter/receiver units.

In addition one of a plurality of standby personnel may be connected direct to the base transmitter/receiver through landlines.

BRIEF DESCRIPTION OF THE DRAWINGS

The present invention will now be described in greater detail by way of example with reference to the accompanying drawing, wherein the sole figure is a block diagram of one preferred form of combined communication, security and alarm radio system.

DESCRIPTION OF THE PREFERRED EMBODIMENT

The combined communication, security and alarm radio system shown in the drawing basically includes a remote control unit 2; a base transmitter/receiver 4; a paging transmitter 6; an alarm message unit 8; a plant alarm unit 10; four hand portable transmitter/receiver units 12; and two paging receivers 14.

The remote control unit 2 is housed in a separate location A and is connected to the base transmitter/receiver 4 via a multi-way lead 16. Another multi-way lead 17 connects the remote control unit 2 to the alarm message unit 8. Preferably in the example described, the alarm message unit 8 is a tape dial out unit. A microphone 20 is also connected to the remote control unit 2 via a lead 21. The base transmitter/receiver unit 4 is connected to the alarm message unit 8 by a lead 18.

The base transmitter/receiver 4, the paging transmitter 6, and alarm message unit 8 and the plant alarm unit 10 are all housed in the same location B, which forms the main equipment centre of the system. The base transmitter/receiver 4 has an aerial 22 associated with it, by which two-way radio communication is established with the portable transmitter/receiver units 12. Likewise, the paging transmitter 6 has an aerial 24 for making contact with paging receivers 14. Whilst in the embodiment shown only two paging receivers are shown, it will be appreciated that up to four could be provided if required, i.e. up to the number of portable transmitter/receiver units 12.

The alarm message unit 8 is a standard piece of telephone equipment suitably modified to interface with the remote control unit 2, and the plant alarm unit 10 and also to cease radio transmissions after a predetermined time for example 20 seconds. It is connected to an exchange landline 23 and when activated can call up to five numbers in sequence in order to transmit a recorded message to any one or more of the five subscribers whose numbers are contained in its store.

The plant alarm unit 10 monitors the operation of the entire plant. A plurality of lights on its panel indicate and identify which particular piece of equipment has failed is malfunctioning, or is in an alarm condition. The plant alarm unit 10 has a first output 25 connected to the paging transmitter 6. A second output 26 is connected to the alarm message unit 8. A delay unit 28 associated with the plant alarm unit 10 ensures that when an alarm is raised for example as a result of equipment failure or malfunctioning, the alarm output goes first to the paging transmitter 6 and after a predetermined delay (approximately 15 minutes) to the alarm message unit 8 unless the alarm condition is accepted by the attendant before the delay period has expired.

The duty attendant location C carries both a transmitter/receiver unit 12 and a paging receiver 14. Other day staff at other unspecified locations D in the plant may carry between them the other three transmitter/receiver units 12 and the other paging receiver 14, or other paging receivers where up to four are provided.

Each portable transmitter/receiver unit 12 is provided with an emergency button 27 by which the operator can raise the alarm in an emergency. Each portable transmitter/receiver unit 12 has its own tone so that each operator is uniquely recognizable by the base transmitter/receiver unit 4 and alarm message unit 8.

The system also includes provision whereby one of three standby officers at locations E, F and G, outside the plant may be connected to the system. A three-way switch 30 is provided in the control location B in order to connect one of the standby officers to the system.

Each of the standby officer locations E, F and G is provided with a remote control unit 32 and a microphone 34. Each remote control unit 32 is connected to one position of the three-way switch 30 via rented landlines 36. Thus according to the position of the switch 30, one of the three remote control units 32 is linked to the base transmitter/receiver 4 and hence to the rest of the personnel on duty who are carrying the portable transmitter/receiver units 12. Thus speech between the portable sets or between the portable sets and the base in the control room A and/or the standby officer is always possible subject to the range of the communication equipment being used.

During normal day-time operation, the operators are all in touch with one another through their handportable transmitter/receiver units 12, and with the base unit 4. If equipment failure or malfunction takes place a suitable warning is transmitted over the paging system so that one or more personnel can go to the control room B in order to identify the faulty equipment and accept the alarm by cancelling the output signal from the plant alarm unit 10. If this alarm output signal is cancelled within the predetermined time the alarm message unit 8 is not activated.

On the other hand, outside normal working hours when there may be only one operator on duty, he can call for assistance if necessary by depressing the emergency button 27 on his portable transmitter/receiver unit 12. When the button 27 is depressed, the transmitter/receiver unit 12 emits a sub audio tone which is picked up and recognized by the base transmitter/receiver 4. The base transmitter/receiver 4 then energizes the alarm message unit 8. The automatic dialling machine then dials out in sequence five stored numbers over the exchange landline 23. When one of the subscribers answers a pre-recorded message is transmitted to indicate that assistance is required. The first part of this message lasting 20 seconds is also transmitted by radio so that the operator who has used his emergency button knows that his call has been answered and any other personnel with hand portable transmitter/receiver units 12 can also take appropriate action. After the 20 second delay has expired the base transmitter/receiver unit 4 then reverts to its standby condition to allow speech between operators. The subscriber who has answered the call can then dial back to the alarm message unit and stop it, so that it does not continue to call the other subscribers whose numbers are contained in its store.

If within radio range, and provided that he has a transmitter/receiver unit 12, the called subscriber can be in touch with the operator who has called for assistance after the 20 seconds delay period has expired in order to ascertain the nature of the trouble.

Furthermore, if equipment failure or malfunction takes place outside normal working hours, the operator on duty is at once notified, since the alarm goes out on the lead 25 and he receives the alarm signal over his paging receiver unit 14. On receiving the alarm signal he can then go to the control room B, ascertain the trouble and cancel the alarm and call for assistance if need be.

On the other hand, if for any reason he does not act within the predetermined time, the delay unit 28 is actuated and the alarm message unit 8 is set in operation to call for assistance from one of the five subscribers whose numbers are stored in the alarm message unit 8.

As a safety measure the plant alarm unit 10 is designed to send out test alarm signals at regular intervals (say every hour). This not only ensures that the alarm system is fully functional but also ensures that the operator is available and not himself in difficulty where he cannot summon help, e.g. he has had a serious fall and damaged his transmitter/receiver unit 12.

The following equipment is standard equipment readily available on the market and accordingly its construction is not shown:

(a) the remote control unit 2 is manufactured by Pye Ltd. under the code number PC1;

(b) the base transmitter/receiver 4 is manufactured by Pye Ltd. under the code name of F 25 FM base station;

(c) the paging transmitter 6 is manufactured by Pye Ltd. and known as an "Olympic" (Registered Trade Mark) transmitter;

(d) the alarm message unit 8 which is in the form of a tape dial out unit is manufactured by Dynamic Logic Ltd. under the code name of "Radle 4S";

(e) the hand portable transmitter/receiver units 12 are manufactured by Pye Ltd. under the name of "Pocketfone" (Registered Trade Mark) and are either model Nos. P5002 or P5004; and (f) the paging receivers 14 are overlay pages manufactured by Pye Ltd. under the name of "Pyecall 5" Type PG1FM.

The above described combined communication, security and alarm radio system has the advantage that it combines the features of a number of separate known systems into one system which can be used for both normal day-time requirements as well as act as a security system during off-duty periods and an alarm system in the event of equipment failure or malfunction.

It thus has the following advantages:

(a) the ability for an operator to activate a call for assistance by radio, from anywhere within radio coverage;

(b) the simultaneous transmission of pre-recorded tape messages by radio and telephone for the first 20 seconds;

(c) the ability to alert an operator by radio of his required presence;

(d) the automatic request for assistance if the operator does not respond; and (e) the plant and its equipment is satisfactorily supervised during quiescent periods whereby failures and malfunctioning can be quickly rectified and thus dangerous situations are avoided.

What is claimed is:

1. A combined communication, security and alarm radio system for supervising equipment in a plant or installation, said system including:
   (a) a remote control unit;
   (b) a base transmitter/receiver in two way voice communication with the remote control unit;
   (c) a plurality of portable transmitter/receiver units tuned to the frequency of the base transmitter/receiver to enable direct voice communication between operators through the base transmitter/receiver;
   (d) an alarm message unit connected to the remote control unit and also to a telephone exchange landline, for sending out pre-recorded alarm messages in sequence to a plurality of subscribers; and
   (e) manually operable means on each portable transmitter/receiver unit for triggering the base transmitter/receiver to activate the alarm message unit, said alarm message unit simultaneously transmitting to the subscribers in sequence the pre-recorded alarm message over the telephone exchange landline and to the portable transmitter/receiver units through the base transmitter/receiver.

2. A system according to claim 1, including a single frequency paging transmitter located at the base transmitter/receiver and including up to as many paging receivers as there are portable transmitter/receiver units.

3. A system according to claim 1, wherein each portable transmitter/receiver unit has its own tone whereby on operation of the manually operable means, each transmitter/receiver unit and hence each operator is uniquely recognizable by the base transmitter/receiver and the alarm message unit.

4. A system according to claim 1, including a plant alarm unit which is automatically activated when either a part of the equipment has broken down or is malfunctioning or when unauthorized entry has been made into the plant or installation.

5. A system according to claim 1, said system further including:
   (f) a single frequency paging transmitter located at the base transmitter/receiver;
   (g) a plurality of paging receivers in radio communication with the paging transmitter; and
   (h) a plant alarm unit which is automatically activated when one of the following events occurs:
      (i) a part of the equipment being supervised has broken down,
      (ii) a part of the equipment being supervised is malfunctioning,
      (iii) unauthorized entry has been made into the plant or installation being supervised.

6. A system according to claim 5, wherein the plant alarm unit on being activated causes the paging transmitter to operate instantaneously and after a predetermined delay causes the alarm message unit to operate in order to transmit the pre-recorded alarm message to the subscribers in sequence and to the portable transmitter/receiver units.

7. A system according to claim 5, wherein there are $(n-x)$ paging receivers, n being equal to the number of portable transmitter/receiver units, and x being less than n.

8. A system according to claim 1, including a plurality of remote means for control units and switch means for connecting one of a plurality of said remote control units directly to the base transmitter/receiver through landlines, to enable one of a plurality of standby personnel to be in communication with the base transmitter/receiver.

9. A system according to claim 4, wherein the alarm message unit is a tape dial out unit which is modified to interface with the remote control unit and the plant alarm unit.

10. A system according to claim 9, wherein the tape dial out unit is adapted to cease radio transmissions after a predetermined time on being activated, after which it returns to the standby state.

* * * * *